United States Patent

[11] 3,537,366

| [72] | Inventors | Dieter Engelsmann,<br>Unterhaching, Germany, and<br>Rolf Schroder, Munich, Germany |
|---|---|---|
| [21] | Appl. No. | 765,332 |
| [22] | Filed | Oct. 7, 1968 |
| [45] | Patented | Nov. 3, 1970 |
| [73] | Assignee | AGFA-Gevaert Aktiengesellschaft,<br>Leverkusen, Germany |
| [32] | Priority | Oct. 27, 1967 |
| [33] | | Germany |
| [31] | | 1,597,077 |

[54] EXPOSURE CONTROL APPARATUS FOR PHOTOGRAPHIC CAMERA
10 Claims, 1 Drawing Fig.

[52] U.S. Cl. .................................................. 95/10,
95/53, 95/64
[51] Int. Cl. ..................................................... G03b 7/12,
G03b 9/62
[50] Field of Search ................................... 95/10(C),
53, 53(Elec. op.), 64, 64(C)

[56] References Cited
UNITED STATES PATENTS

| 3,063,354 | 11/1962 | Matulik ........................ | 95/10(C)UX |
| 3,286,610 | 11/1966 | Fahlenberg .................. | 95/10(C)UX |
| 3,433,140 | 3/1969 | Wick et al. .................... | 95/10(C)UX |
| 3,434,403 | 3/1969 | Biedermann et al. ......... | 95/10(C)UX |

*Primary Examiner*—John M. Horan
*Assistant Examiner*—Joseph F. Peters, Jr.
*Attorney*—Michael S. Striker

ABSTRACT: One or more fixed resistors of a set of resistors can be connected in the circuit of the light meter as well as in the delay circuit of the shutter in a photographic camera to thereby influence the aperture size as a function of the film speed and the exposure time. The shutter release trigger completes the circuit of the light meter ahead of the delay circuit so that the diaphragm defines an aperture size which is a function of scene brightness and a function of the film speed prior to release of the shutter.

Patented Nov. 3, 1970
3,537,366
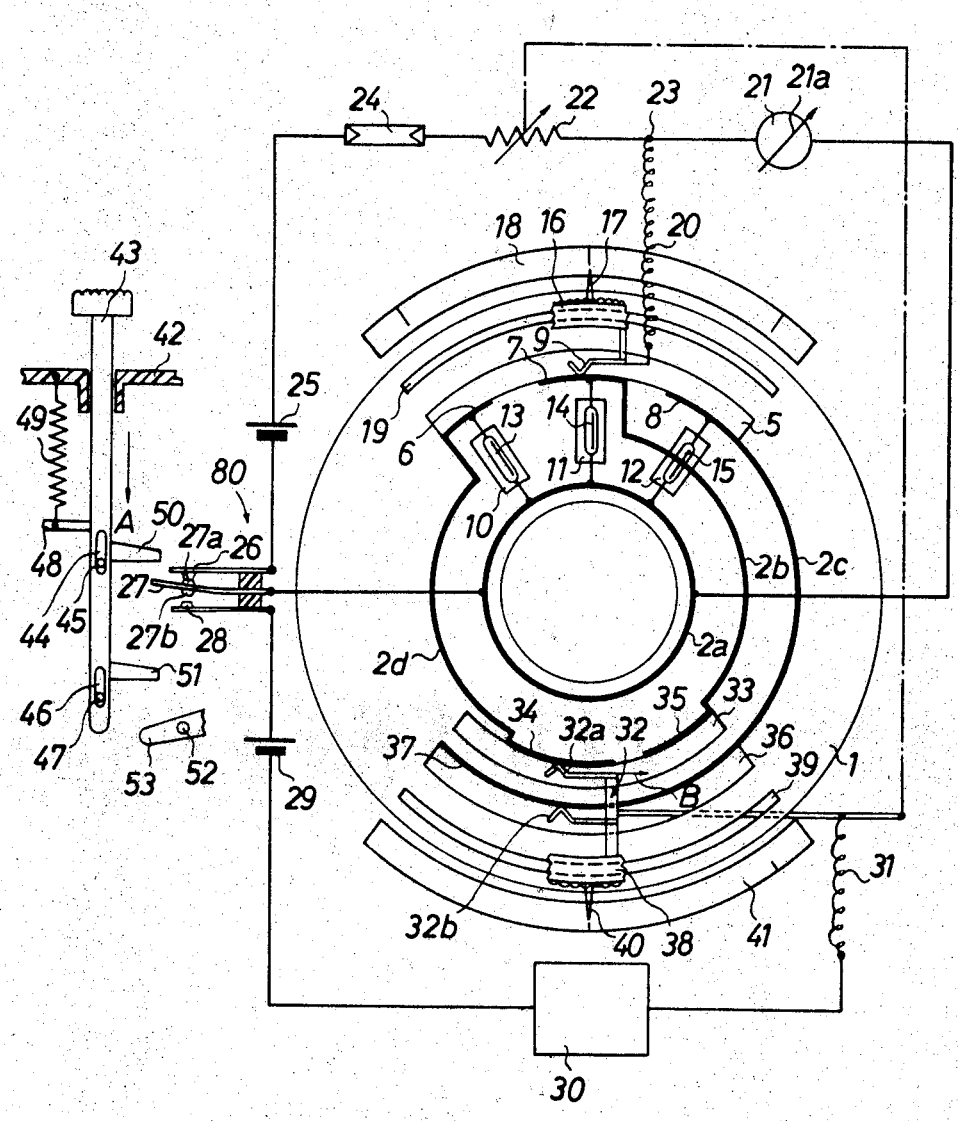
INVENTORS
DIETER ENGELSMANN
ROLF SCHRÖDER
BY Michael S. Striker
Attorney

3,537,366

EXPOSURE CONTROL APPARATUS FOR PHOTOGRAPHIC CAMERA

BACKGROUND OF THE INVENTION

The present invention relates to photographic apparatus in general, and more particularly to improvements in cameras wherein the exposure time is determined by an electric delay circuit and wherein the aperture size furnished by the diaphragm is variable as a function of the intensity of scene light. Still more particularly, the invention relates to improvements in cameras wherein the exposure values can be adjusted as a function of speed or sensitivity of film which is used therein.

It is already known to provide a photographic camera with a manually operable selector which can determine the exposure time by effecting appropriate adjustment of the delay circuit in the shutter and which can also change the sensitivity of the light meter as a function of the film speed. The diaphragm is directly or indirectly coupled with and is adjustable by the light meter. A drawback of the just described cameras is that they must include separate resistors for the light meter and for the delay circuit of the shutter.

SUMMARY OF THE INVENTION

It is an object of the present invention to provide a photographic apparatus wherein the resistors which are utilized to adjust the delay circuit of the shutter can also be employed as a means for influencing the sensitivity of the light meter (and hence the aperture size) in dependency on the film speed.

Another of the invention is to provide a photographic apparatus wherein the circuits of the light meter and shutter comprise a small number of parts and wherein such parts can be accommodated in a small area.

A further object of the invention is to provide a photographic apparatus wherein the light meter which controls the aperture size can be adjusted (*i.e.*, sensitivity can be changed) so as to take into consideration a selected one of two, three or more different film speeds.

The invention is embodied in a photographic apparatus which comprises a first circuit including light-meter means arranged to adjust the aperture size as a function of scene brightness, a second circuit including adjustable delay means arranged to determine the exposure time furnished by the shutter, a plurality of preferably fixed resistors having different resistances, first selector means for connecting at least one of the resistors into the first circuit to thereby influence the aperture size as a function of film speed, and second selector means for connecting at least one of the resistors into the second circuit to thereby influence the exposure time as a function of the resistance of the resistor or resistors selected by the second selector means. The delay means preferably includes an electronic circuit with an adjustable R–C unit. The first and second circuits preferably comprise a common main conductor which is connected with one terminal of each resistor and each of the selector means may comprise one or more wipers which are movable into and away from current-conducting engagement with the other terminals of the resistors. The wiper or wipers of one selector means are movable independently of the wiper or wipers of the other selector means and the second selector means preferably comprises several wipers which can connect two or more resistors in parallel to each other and in the second circuit. The characteristic curves of the first and second circuits are preferably inclined in opposite directions with reference to each other.

The shutter release trigger of the apparatus is provided with actuating means for completing one of the first and second circuits ahead of the other circuit and for thereupon completing the other circuit while simultaneously deenergizing the one circuit. Each of the two circuits preferably comprises a separate energy source. 1

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of a specific embodiment with reference to the accompanying drawing.

BRIEF DESCRIPTION OF THE DRAWING

The single FIG. is a schematic partly sectional view of a still camera which embodies the invention.

DESCRIPTION OF THE PREFERRED EMBODIMENT

The drawing illustrates a supporting plate 1 of insulating material which carries four conductors 2a, 2b, 2c, 2d including a main conductor 2a. The plate 1 is formed with an arcuate cutout or window 5 which is flanked by the end portions 6, 7, 8 of the conductors 2d, 2b, 2c, respectively. Each of these end portions 6, 7, 8 can be engaged by a movable wiper 9.

The plate 1 is formed with three additional cutouts or windows 10, 11, 12 which respectively accommodate fixed resistors 13, 14 and 15 having different resistances. The terminals of resistors 13, 14, 15 are respectively connected to the end portions 6, 7, 8 and to the main conductor 2a. The conductors 2b, 2c and 2d constitute elongated outer terminals of the resistors 14, 15 and 13. The aforementioned wiper 9 is fixedly secured to and can be said to form part of a manually operable selector 16 having an index 17 which is movable along a scale 18. The selector 16 is installed in and is movable along a scale 18. The selector 16 is installed in and is movable along a further cutout or window 19 of the plate 1. The wiper 9 is connected with a flexible lead 20 which is further connected to a tap 23 located between a variable adjusting resistor 22 and a light meter 21, *e.g.*, a customary moving-coil instrument.

The circuit of the light meter 21 further comprises a photosensitive receiver 24, *e.g.*, a photoelectric resistor, which is in series with the adjusting resistor 22 and with one pole of an energy source here shown as a battery 25. The other pole of the battery 25 is connected with a fixed contact 26 forming part of a two-way switch 80. The latter further comprises a second fixed contact 28 and a movable contact 27 located between the contacts 26, 28 and having two heads 27a, 27b which can respectively engage with the contracts 26, 28. The movable contact 27 is connected with the main conductor 2a; the latter is further connected with one terminal of the light meter 21. The fixed contact 28 of the switch 80 is connected with one pole of a second energy source 29 (*e.g.*, a battery) in the circuit of an electronic delay device 30. This delay device 30 is connected with a twin wiper 32 by a flexible lead 31. The wiper 32 comprises wipers 32a, 32b the former of which can slide along the second end portion 34 of the conductor 2d or along the second end portion 35 of the conductor 2b. This wiper 32a is movable in a further cutout or window 33 of the plate 1 and the wiper 32b is movable in a window 36. The wiper 32b is movable along the second end portion 37 of the conductor 2c. It will be seen that the end portions 34, 35, 37 are respectively connected with and can be said to form extensions of outer terminals of the resistors 13, 14 and 15.

The twin wiper 32 is rigid with and forms part of a manually operable selector 38 having a index 40 movable along a fixed scale 41. The plate 1 is formed with an arcuate window or cutout 39 for the selector 38. The wiper 32 is mechanically connected with the movable portion of the adjusting resistor 22 so that the resistance of this resistor varies in automatic response to displacement of the selector 38.

The numeral 42 denotes the housing or body of the photographic camera. This body accommodates a shutter release trigger 43 which is reciprocable in and counter to the direction indicated by arrow A and is biased upwardly to a starting position by a return spring 49. The body 42 is formed with guide pins 45, 47 for elongated slots 44, 46 provided in the trigger 43. The spring 49 operates between the body 42 and an arm 48 of the trigger 43. This trigger is further provided with an actuating member or trip 50 and with a motion transmitting member or arm 51. The movable contact 27 of the aforementioned switch 80 normally bears against the fixed contact 26; this movable contact is located in the path of movement of the trip 50 so that the latter can move it downwardly, as viewed in the drawing, and into engagement with the fixed contact 28. When the contact 27 engages the contact 26, the circuit of the light meter 21 is completed. This circuit is deenergized and the circuit of the delay device 30 is completed when the contact 27 engages with the contact 28. The arm 51 can rock a lever 53 which forms part of the shutter and is pivotable on a pin 52.

THE OPERATION

In the illustrated condition of the camera, the circuit including the light meter 21, adjusting resistor 22 and photosensitive receiver 24 is completed by way of the control switch 80 (contacts 26, 27) and the main conductor 2a. The resistor 14 is connected in parallel with the light meter 21 because the wiper 9 of the selector 16 engages the end portion 7 of the conductor 2b, i.e., the outer terminal of the resistor 14. By shifting the wiper 9 into engagement with the end portion 6 or 8, the operator of the camera can connect the light meter 21 in parallel with the resistor 13 or 15. The adjustment involving the connection of resistor 13, 14 or 15 in parallel with the light meter 21 is necessary to account for the sensitivity or speed of film which is being used in the camera.

An exposure is made by depressing the trigger 43 in the direction indicated by arrow A. The output member 21a of the light meter 21 is then clamped between a customary movable scanning member (not shown and a back support or stop, and the scanning member automatically adjusts the diaphragm (not shown) as a function of the position of the output member 21a, i.e., as a function of the intensity of scene light and as a function of the film speed. As the operator continues to depress the trigger 43, the trip 50 moves the contact 27 away from the fixed contact 26 to open the circuit of the light meter 21 and into engagement with the fixed contact 28. This completes the circuit which includes the delay device 30 and the battery 29. The circuit of the parts 29, 30 further includes two of the resistors 13—15, i.e., two of those resistors which are utilized to effect appropriate initial adjustment of the light meter 21 as a function of the sensitivity of film which is being utilized in the camera. In their illustrated positions, the wipers 32a, 32b respectively connect the outer terminals of resistors 13 and 15 in parallel with each other and in the circuit of the delay device 30. If the operator decides to move the selector 38 in the direction indicated by arrow B, the wiper 32a engages the end portion 35 whereas the wiper 32b continues to remain in current-conducting engagement with the end portion 37. Thus, the resistors 14, 15 are then connected in parallel to each other and into the circuit of the delay device 30. Such connection or disconnection of resistors into or from the circuit of the delay device 30 can be utilized to vary the resistance of an R-C unit in the device 30. As stated before, the twin wiper 32 is mechanically connected with the slider of the adjustable resistor 22 so that the resistance of the resistor 22 varies in response to changes in the position of wipers 32a, 32b. In this way the aperture size defined by the adjustable diaphragm is varied in accordance with changes in the exposure time determined by the delay device 30.

The improved camera is susceptible of many modifications without departing from the spirit of the present invention. For example, the number of fixed resistors (such as those numbered 13, 14 and 15) can be increased beyond three. Also, the twin wiper 32 can be replaced by two discrete wipers or by a wiper with three or more wiping elements. The number of fixed resistors determines the number of film speeds and the number of wipers on the selector 38 determines the number of exposure times which can be selected by the device 30.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

We claim:

1. In a photographic apparatus, a combination comprising a first circuit including light meter means arranged to adjust the aperture size as a function of scene brightness; a second circuit including adjustable delay means arranged to determine the exposure time furnished by the shutter; a plurality of resistors having different resistances; first selector means for connecting as least one of said resistors into said first circuit to thereby influence the aperture size as a function of the sensitivity of film which is utilized in the apparatus; and second selector means for connecting at least one of said resistors into said second circuit to thereby influence the exposure time as a function of the resistance of said last mentioned resistor.

2. A combination as defined in claim 1, wherein said delay means comprises an R-C unit and wherein said resistors are fixed resistors.

3. A combination as defined in claim 1, wherein said first and second circuits comprise a common main conductor and wherein one terminal of each of said resistors is connected to said common conductor, each of said selector means comprising wiper means movable into and away from current-conducting engagement with the other terminals of said resistors.

4. A combination as defined in claim 3, wherein said wiper means are movable independently of each other.

5. A combination as defined in claim 1, wherein said second selector means comprises means for connecting two of said resistors in parallel to each other and in said second circuit.

6. A combination as defined in claim 1, wherein the characteristic curves of said circuits are inclined with reference to each other.

7. A combination as defined in claim 1, further comprising shutter release trigger means provided with actuating means for completing one of said circuits ahead of the other circuit and for thereupon completing said other circuit while deenergizing said one circuit.

8. A combination as defined in claim 7, wherein said one circuit is said first circuit.

9. A combination as defined in claim 1, further comprising separate energy sources in said circuits.

10. A combination as defined in claim 1, wherein said light meter means comprises a moving coil instrument having an adjustable output member and wherein said first circuit comprises photosensitive receiver means for adjusting said output member as a function of the intensity of scene light.